US005956492A

United States Patent [19]
Jander et al.

[11] Patent Number: 5,956,492
[45] Date of Patent: Sep. 21, 1999

[54] N-DEEP FIXED LATENCY FALL-THROUGH FIFO ARCHITECTURE

[75] Inventors: Mark J. Jander; Jeffrey D. Kasyon, both of Colorado Springs, Colo.

[73] Assignee: LSI Logic Corporation, Milpitas, Calif.

[21] Appl. No.: 08/625,665

[22] Filed: Mar. 29, 1996

[51] Int. Cl.⁶ .............................. G06F 13/12; G06F 13/14
[52] U.S. Cl. ........................... 395/286; 395/286; 395/877; 365/211; 711/133
[58] Field of Search .............. 365/211; 395/286, 395/877; 711/133

[56] References Cited

U.S. PATENT DOCUMENTS

| | | | |
|---|---|---|---|
| 4,151,609 | 4/1979 | Moss | 365/221 |
| 4,374,428 | 2/1983 | Barnes | 364/900 |
| 4,486,854 | 12/1984 | Yuni | 364/900 |
| 4,616,338 | 10/1986 | Helen et al. | 364/900 |
| 4,642,797 | 2/1987 | Hoberman | 365/221 |
| 4,833,655 | 5/1989 | Wolf et al. | 365/221 |
| 4,862,419 | 8/1989 | Hoberman | 365/221 |
| 5,134,562 | 7/1992 | Hattori et al. | 395/400 |
| 5,241,644 | 8/1993 | Nomura et al. | 395/425 |
| 5,276,807 | 1/1994 | Kodama et al. | 395/200 |
| 5,363,485 | 11/1994 | Nguyen et al. | 295/250 |
| 5,381,538 | 1/1995 | Amini et al. | 711/133 |
| 5,471,583 | 11/1995 | Au et al. | 395/877 |
| 5,473,755 | 12/1995 | Dunning | 395/286 |

FOREIGN PATENT DOCUMENTS 0017552   1/1985   Japan .............................. G06F 13/00

*Primary Examiner*—Paul Loomis
*Assistant Examiner*—Hassen A. Mia
*Attorney, Agent, or Firm*—Duke W. Yee; Wayne P. Bailey

[57] ABSTRACT

A first-in-first-out (FIFO) memory system. The FIFO memory system contains a first fall-through FIFO having an input and an output. A pointer-based FIFO having an input and an output, wherein the input of the pointer-based FIFO is connected to the output of the first fall-through FIFO. The FIFO memory system also includes a second fall-through FIFO having an input and an output, wherein the input of the second fall-through FIFO is connected to the output of the pointer-based FIFO, wherein data placed into the input of the first fall-through FIFO appears at the output of the second fall-through FIFO in a first-in-first-out basis.

20 Claims, 15 Drawing Sheets

N-DEEP FIXED LATENCY FALL-THROUGH FIFO ARCHITECTURE

BACKGROUND OF THE INVENTION

1. Technical Field

The present invention relates generally to an improved memory system, and in particular to a first-in-first-out (FIFO) memory system. Still more particularly, the present invention relates to an improved fall-through FIFO.

2. Description of the Related Art

A FIFO is essentially a data buffer in which data is shifted out in the same chronological order as it was shifted in with the shifting in and shifting out operations typically being asynchronous, thereby enabling the transfer of data between two asynchronous devices. One type of FIFO is a fall-through FIFO. Memory locations in a fall-through FIFO are sequentially associated with each other. In the operation of a fall-through FIFO, the first word to be stored is entered into the first memory location and then automatically ripples down to the last empty memory location in the fall-through FIFO. This empty memory location is the last memory location in an initially empty fall-through FIFO. A second word stored enters into the first location and then ripples down until it comes to the last empty location and then stops, thereby being stored in the second from the last location in the bank of memory locations.

When a word is read out of the memory in the fall-through FIFO, it is read out from the bottom of the memory bank, which would be the first word written into the fall-through FIFO. The second word would then move into the now empty last memory location in the fall-through FIFO.

If, in the mean time, additional words have been written into the fall-through FIFO, these words would have rippled into the locations starting from the second memory location from the bottom of the last location in the fall-through FIFO. Thus, when the first word written is read out of the last location thereof, there would be a rippling effect running up the fall-through FIFO from the last memory location caused by the moving down of each word in succession into the next lower word location of the fall-through FIFO.

With the performance requirements of bus systems, such as a peripheral component interconnection (PCI) bus, burst sizes are increased such that larger fall-through FIFOs are required. For example, presently existing fall-through FIFOs are about 96 bytes in size and designed as a standard fall-through FIFO. By increasing the size of this type of FIFO to 512 bytes for burst sizes of 128 D-words on a PCI bus, the fall-through time is increased. In fact, the fall through time becomes excessive and does not meet the requirements for fall-through FIFOs used for direct memory access.

Therefore, it would be advantageous to have an improved method and apparatus directed towards a FIFO memory system in which the data latency or time needed for data to fall-through the FIFO are minimized.

SUMMARY OF THE INVENTION

The present invention provides a first-in-first-out (FIFO) memory system. The FIFO memory system contains a first fall-through FIFO having an input and an output. The FIFO memory system includes a pointer-based FIFO having an input and an output, wherein the input of the pointer-based FIFO is connected to the output of the first fall-through FIFO. The FIFO memory system also includes a second fall-through FIFO having an input and an output, wherein the input of the second fall-through FIFO is connected to the output of the pointer-based FIFO, wherein data placed into the input of the first fall-through FIFO appears at the output of the second fall-through FIFO in a first-in-first-out basis.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
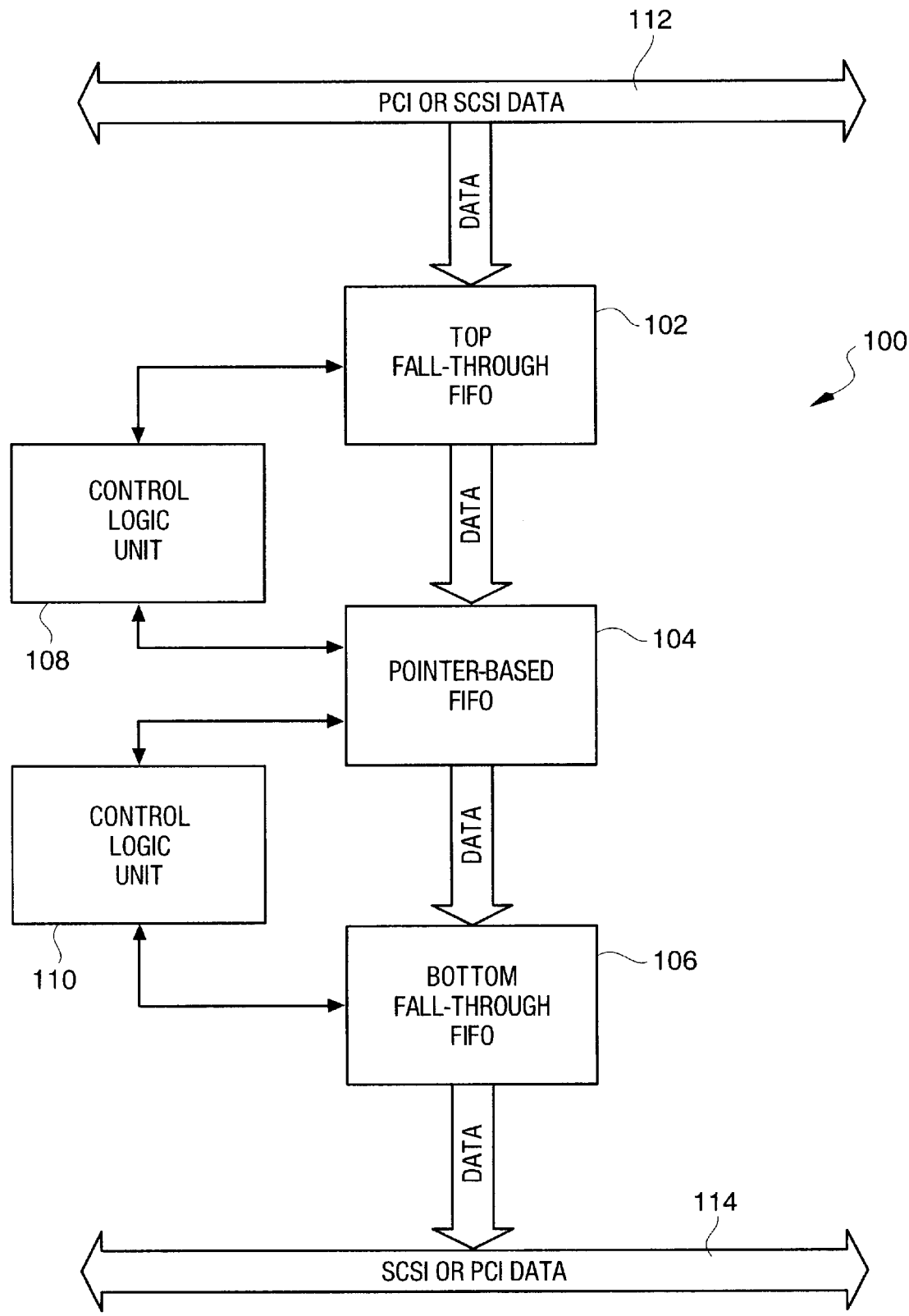
FIG. 1 is a block diagram of fall-through FIFO architecture in a data processing system according to the present invention.

With reference now to the figures, and in particular with reference to FIG. 1, a block diagram of a fall-through FIFO architecture in a data processing system is depicted according to the present invention. FIFO memory system 100 includes three stages: top fall-through FIFO 102, pointer-based FIFO 104, and bottom fall-through FIFO 106. Control logic unit 108 and control logic unit 110 are the control logic units in FIFO memory system 100 employed to control the movement of data through these three FIFO stages.

Data enters FIFO memory system 100 from data source 112 into the top of top fall-through FIFO 102 and falls through to the bottom of top level fall-through FIFO 102. Control logic unit 108 senses the presence of data at the bottom of top fall-through FIFO 102 and loads it into an open address in pointer-based FIFO 104. At that point, control logic unit 110 senses the presence of the data in pointer-based FIFO 104 and loads that data into bottom fall-through FIFO 106 when space is present in bottom fall-through FIFO 106. When data is loaded from pointer-based FIFO 104 into bottom fall-through FIFO 106, the data falls from the top of bottom fall-through 106 to the bottom of FIFO 106. At that point, the data can be read out into destination 114. Top fall-through FIFO 102 and bottom fall-through FIFO 106 may be implemented using any known fall-through FIFO. Similarly, pointer-based FIFO 104 may be implemented using any known pointer-based FIFO. The combination and movement of data through these FIFOs provides the advantages of the present invention. Data source 112 may be, for example, a SCSI (Small Computer System Interface) or PCI (Peripheral Component Interconnect) bus in the depicted example. Similarly, destination 114 also may be a SCSI or PCI bus in the depicted example.

According to the present invention, pointer-based FIFO 104 provides the ability to fix the latency of data within FIFO memory system 100. Unlike a true fall-through FIFO, in which the time for data to appear at the bottom stage increases proportionally with the number of levels, the size of the pointer-based FIFO 104 in FIFO memory system 100, can be increased by n number of bits and the change in access time will be minimal. Therefore, increasing the size of FIFO memory system 100 by increasing the size of pointer-based FIFO 104 does not increase the time it takes for data to appear at the bottom of this FIFO memory system.

FIFO memory system 100 also provides an advantage over a pointer-based only FIFO system in which a pointer-based FIFO system requires a read cycle operation with a certain amount of access time before the data appears and can be read out. According to the present invention, as illustrated in FIFO memory system 100, the data is ready and waiting before the read cycle starts. This provides an advantage when fast data access is required.

Additionally, FIFO memory system 100 includes synchronization for asynchronous in-bound or out-bound data. Since the top and bottom stages of FIFO memory system 100 are fall-through FIFO stages, data can be written or read at any time. Both control logic unit 108 and control logic unit 110 can operate for a single clock transfer function or as a two stage synchronizer for read or write data. The synchronous operation of FIFO memory system 100 can transfer data on each clock while the asynchronous function of FIFO memory system 100 can transfer data once every two clocks in the worst case environment. FIFO memory system 100 can be operated as being synchronous at both the top and bottom ends, asynchronous at both ends, or in a synchronous/asynchronous combination.

Figure 2A:
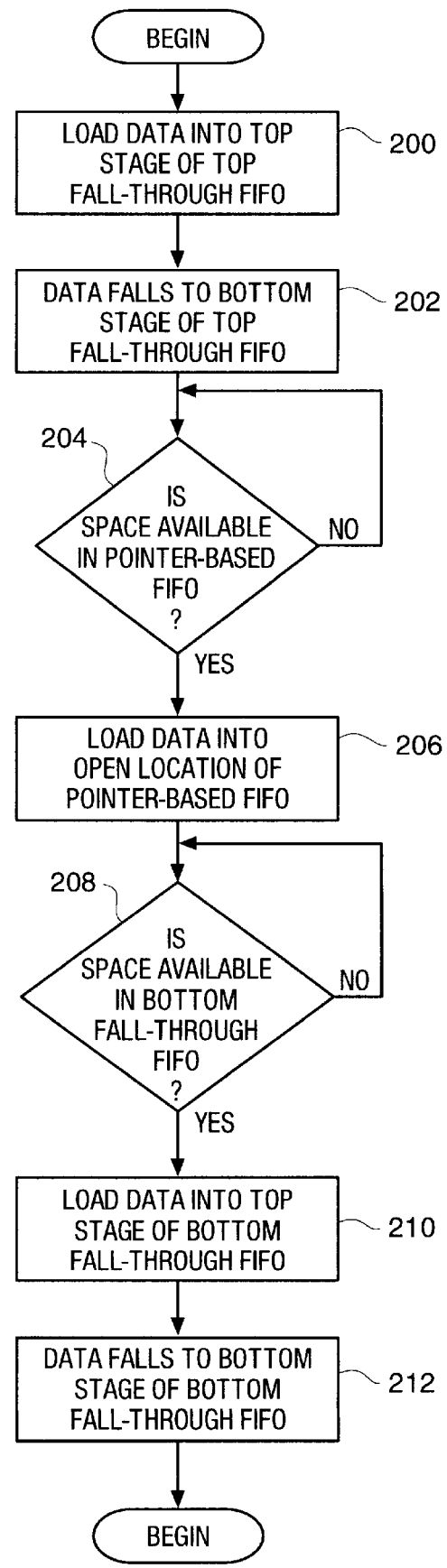
FIGS. 2A and 2B are flowcharts illustrating processes for loading and unloading data in the FIFO memory system as illustrated in FIG. 1 according to the present invention.
Figure 2B:
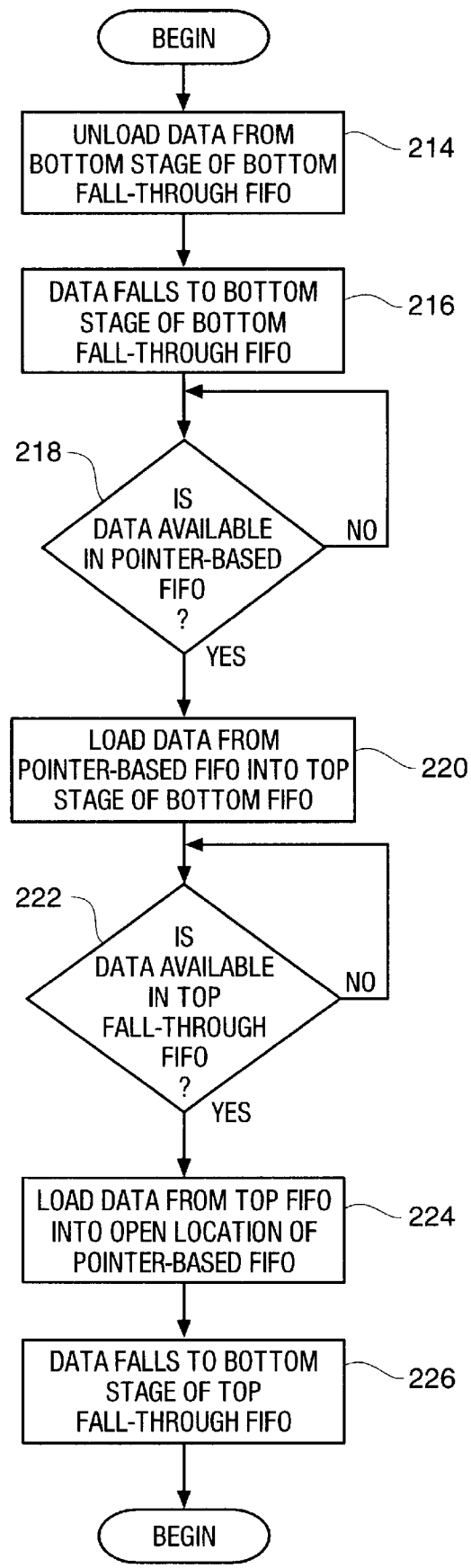

Turning now to FIGS. 2A and 2B, flowcharts illustrating processes for loading and unloading data in the FIFO memory system depicted in FIG. 1 are illustrated according to the present invention. FIGS. 2A and 2B illustrate the operation of FIFO memory system 100 already containing data. The process begins by loading data into the top fall-through FIFO 102 (step 200). Data is placed into the input of top fall-through FIFO 102 into the first memory location, which is also called the "first stage". Thereafter, data moves through the sequentially associated memory locations, "falling" to the bottom of top fall-through FIFO 102. By falling to the bottom of top fall-through FIFO 102, the data moves to the first empty memory location, which is the last memory location (also called the "bottom stage") in top fall-through FIFO 102, if no other data is present within this FIFO. If data is present in top fall-through FIFO 102, the data moves through the sequentially associated memory locations to the first empty location and eventually makes its way to the last memory location. A determination is then made as to whether space is available in pointer-based FIFO 104 (step 204). If space is unavailable, the process returns to step 204.

Upon availability of space in pointer-based FIFO 104, the process loads data from the last memory location of top fall-through FIFO 102 into an open location in pointer-based FIFO 104 (step 206). Thereafter, a determination is made as to whether space is available in bottom fall-through FIFO 106 (step 208). This determination entails determining whether the first memory location in bottom fall-through FIFO 106 is empty. If space is unavailable, the process returns to step 208. Otherwise, the process loads data into the first memory location of bottom fall-through FIFO 106 (step 210). Thereafter, data falls to the bottom stage of bottom fall-through FIFO 106 (step 212).

Steps 204 and 206 are controlled by top control logic unit 108 in FIG. 1 and steps 208 and 210 are controlled by control logic unit 110 in FIG. 1.

Next, the process then proceeds to unload data as illustrated in FIG. 2B. The process begins by unloading data from the last memory location of bottom fall-through FIFO 106 (step 214). Thereafter, data falls to the bottom of bottom fall-through FIFO 106 (step 216). A determination is then made as to whether data is available in pointer-based FIFO 104 (step 218). If data is not available, the process continues to return to step 218. Upon availability of data in pointer-based FIFO 104, the process loads data from pointer-based FIFO 104 into the top of bottom fall-through FIFO 106 (step 220).

The process then determines whether data is available in the bottom of top fall-through FIFO 102 (step 222). If data is not available, the process returns to step 222. If data is available, the process then loads data from top fall-through FIFO 102 into an open location in pointer-based FIFO 104 (step 224). Thereafter, data falls to the bottom of top fall-through FIFO 102. The process then loads data into top fall-through FIFO 102 in the manner depicted in FIG. 2A, as described above. Data can be loaded when the top stage of top fall-through FIFO 102 has a location to accept data. Data is unloaded from the bottom of bottom fall-through FIFO 106 when data is present at bottom of this FIFO.

Steps 218 and 220 are controlled by control logic unit 110 while steps 222 and 224 are controlled by control logic unit 108.

Figure 3:
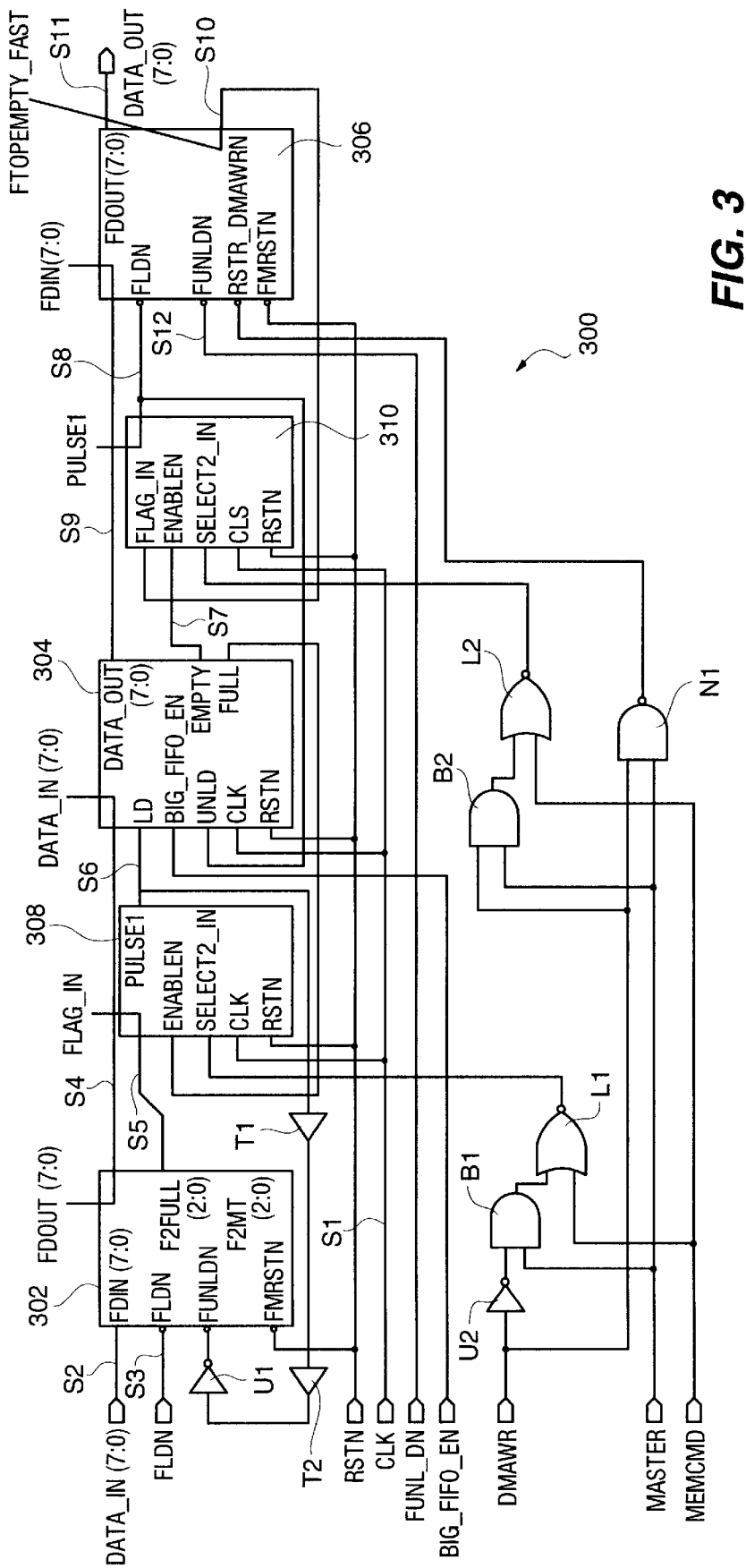
FIG. 3 is a schematic diagram of a FIFO memory system depicted in FIG. 1 according to the present invention.

Turning next to FIG. 3, a schematic diagram of FIFO memory system 100 from FIG. 1 is depicted according to the present invention. FIFO memory system 300 includes a top fall-through FIFO 302, a pointer-based FIFO 304, and a bottom fall-through FIFO 306. FIFO memory system 300 also includes top control logic unit 308 and bottom control logic unit 310. Top fall-through FIFO 302 includes input DATA_IN(7:0), which loads data into the top stage of top fall-through FIFO 302. Additionally, a signal applied to input FLDN instructs top fall-through FIFO 302 to load data from input DATA_IN(7:0).

Input FUNLDN tells top fall-through FIFO 302 to unload data from the bottom stage. A signal at this input indicates that pointer-based FIFO 304 is ready for data and that top fall-through FIFO 302 should unload data to pointer-based FIFO 304. Output FDOUT(7:0) is the data output for top fall-through FIFO 302. This output is connected to DATA_IN(7:0) in pointer-based FIFO 304. Output F2FULL(2:0) in top fall-through FIFO 302 is used to indicate that top fall-through FIFO 302 has data that is ready to be loaded into pointer-based FIFO 304. This indication serves as an input to top control logic unit 308.

Turning now to pointer-based FIFO 304, this stage includes an input LD, which is used to instruct pointer-based FIFO 304 to load data from top fall-through FIFO 302. This command originates from the output PULSE1 in top control logic unit 308. Pointer-based FIFO 304 also includes a clock input CLK, a reset input RSTN, and an unload input UNLD. The unload input UNLD is connected to output PULSE1 in bottom control logic unit 310. A signal at this input indicates that data should be unloaded from pointer-based FIFO 304 through output DATA_OUT(7:0) in pointer-based FIFO 304. This output is connected to input FDIN(7:0) in bottom fall-through FIFO 306. Input BIG_FIFO_EN is an input to change the depth of the pointer-based FIFO 304. Output EMPTY indicates whether pointer-based FIFO 304 is empty. This output is connected to input ENABLEN in bottom control logic unit 310. Output FULL is connected to input ENABLEN in top control logic unit 308. An indication that pointer-based FIFO 304 is full disables top control logic unit 308, preventing additional data from being moved into pointer-based FIFO 304.

Bottom fall-through FIFO 306 contains inputs and outputs similar to those found in top fall-through FIFO 302. Data input FDIN(7:0) in bottom fall-through FIFO 306 is connected to output DATA_OUT(7:0) in pointer-based FIFO 304. Commands to load data into input FLDN in bottom fall-through FIFO 306 come from output PULSE1 in bottom control logic unit 310. Input FUNLDN in bottom fall-through FIFO 306 is connected to an external signal which, when asserted, instructs bottom FIFO 306 to unload data from the bottom stage of bottom fall-through FIFO 306.

Output FTOPEMPTY_FAST is connected to input FLAG_IN in bottom control logic unit 310 and indicates that the top of the FIFO is full. This indicates to bottom control logic unit 310 that bottom fall-through FIFO 306 is full and no more room is available for data to be placed within this FIFO. Input DMAWR is connected to NAND gate N1, which in turn is connected to input signals MEMCMD and MASTER. This input indicates whether a read/write operation and whether a master/slave operation is occurring. Input signal DMAWR is an input for the DMA rate telling FIFO memory system 300 whether the rate is for a PCI or SCSI type of transfer according to the present invention. MASTER signal indicates to FIFO memory system 300 whether a master or slave is the originator of the data. If signal DMAWR is high or a logic "1", the output of FIFO memory system is to a PCI standard while the input is for a SCSI standard. Input MEMCMD indicates to FIFO memory system 300 whether data is coming in from a PCI system and going out to a PCI system. Input SELECT2_1N is low in top control logic unit 308 and bottom control logic unit 310 if a PCI standard is being employed. Output FDOUT(7:0) is the output from the bottom fall-through FIFO 306.

Buffer T1, buffer T2, and inverter U1 are employed to provide a delay. This delay allows sufficient time to load data into the pointer-based FIFO before unloading data from the top fall-through FIFO. Inverter U2, AND gate B1 and NOR gate L1, along with AND gate B2 and NOR gate L2, are used to select clock delays in top control logic unit 308 and bottom control logic unit 310. In the depicted example, when input is connected to a SCSI bus and output is connected to a PCI bus, top control logic unit 308 has a two clock delay while bottom control logic unit 310 has a one clock delay. When input DATA_IN (7:0) is connected to a PCI bus and output DATA_OUT (7:0) to a SCSI bus, top control logic unit 308 has a single clock delay while bottom control logic unit 310 has a two clock delay. When both input DATA_IN (7:0) and output DATA_OUT (7:0) of FIFO memory system 300 are connected to a PCI bus, both control logic units have a single clock delay according to the present invention. NAND gate N1 in FIG. 3 provides for faster data output from the bottom FIFO.

Figure 4:
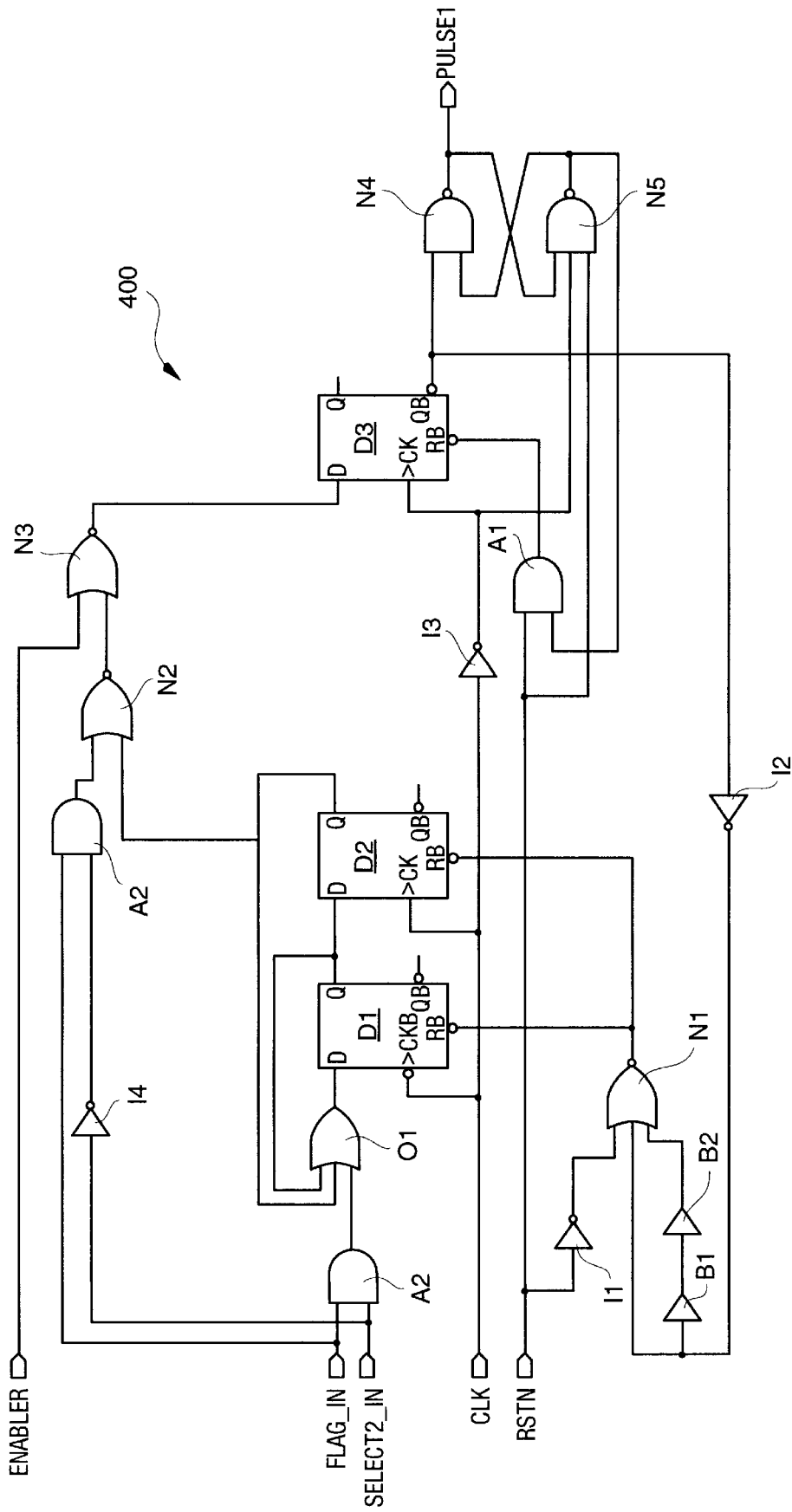
FIG. 4 is a schematic diagram of a control logic unit from FIG. 3 according to the present invention.

With reference now to FIG. 4, a schematic diagram of a control logic unit from FIG. 3 is depicted according to the present invention. Control logic unit 400 includes D flip-flops D1–D3. Inverters I1 and I2, buffers B1 and B2, NOR gate N1 and AND gate A1 are used in conjunction with reset signal RSTN to reset D flip-flops D1–D2. A clock signal CLK is provided to the clock input of D flip-flops D1–D2. D flip-flop D1 is a negative-edged triggered D flip-flop with a reset input, while D flip-flops D2 and D3 are positive-edged-triggered flip flops with a reset input. The clock signal into D flip-flop D3 is inverted by invertor I3. Signals FLAG_IN and SELECT2_1N are used as inputs into D flip-flop D1 via AND gate A2 and OR gate O1. Feedback from D flip-flop D1 and D2 are routed into OR gate O1. Additionally, the output of D flip-flop D2 is used as input into NOR gate N2. Signals FLAG_IN and SELECT2_1N also are used as inputs into AND gate A2 with inverter I4 for inverting the SELECT2_1N signal. The output of AND gate A2 is used as input into NOR gate N2 along with the output of D flip-flop D2. The output from NOR gate N2 is connected to an input of NOR gate N3, which also has an enable signal ENABLEN as an input. The output of NOR gate N3 is connected into the input of D flip-flop D3. D flip-flop D3 provides an output through NAND gates N4 and N5 to produce an output signal PULSE1.

Figure 5:
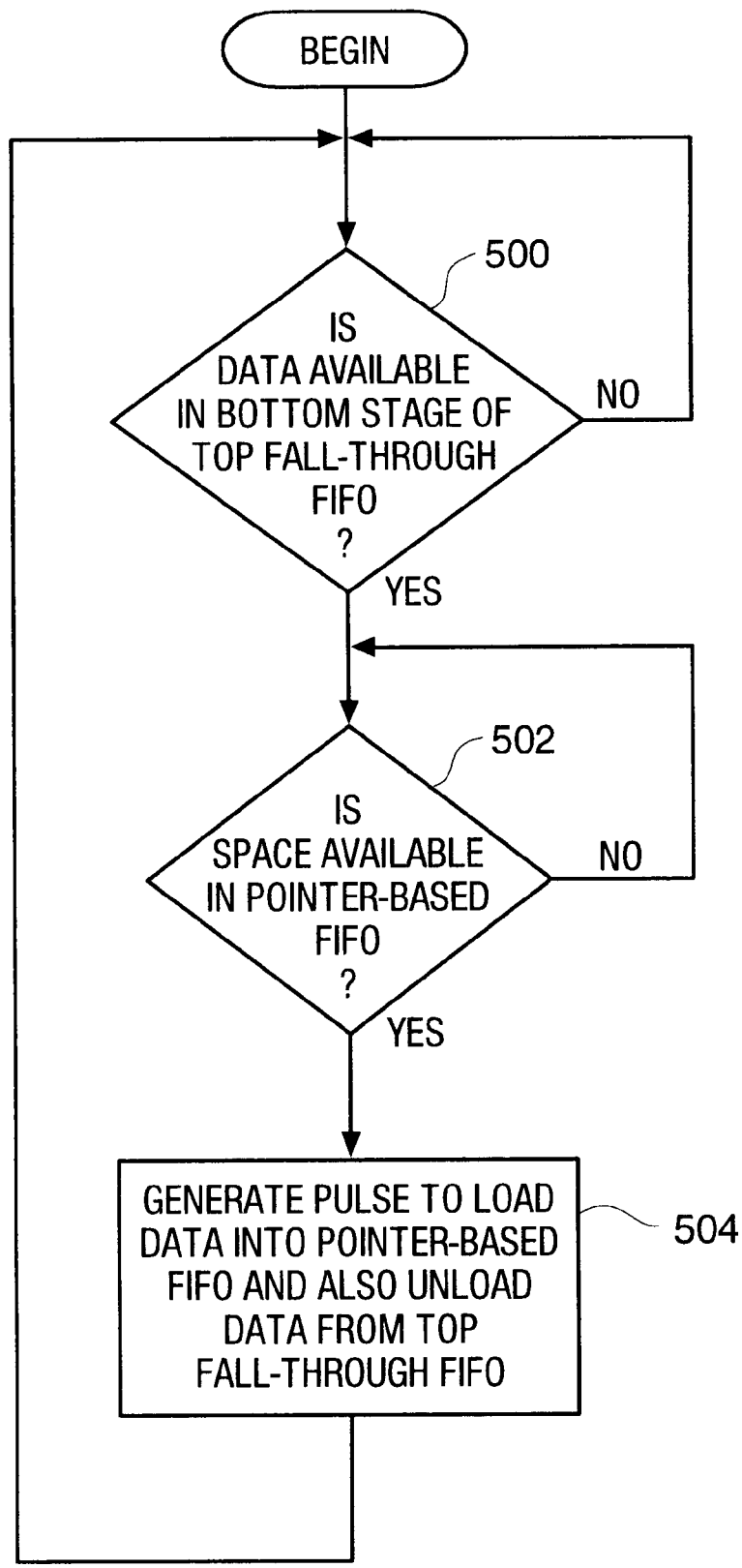
FIG. 5 is a flowchart of a process followed by a top control logic unit in FIG. 1 to load data according to the present invention.

Turning now to FIG. 5, a flowchart of a process followed by control logic unit 108 depicted in FIG. 1 to load data is depicted according to the present invention. The process begins by determining whether data is available in top fall-through FIFO 102 (step 500). If no data is available, the process continues to return to step 500. Upon data being available in the bottom stage of top fall-through FIFO 102, the process then determines whether space is available for data in pointer-based FIFO 104 (step 502). If space is unavailable in pointer-based FIFO 104, the process returns to step 502. Otherwise, the process generates a pulse or signal to load data into pointer-based FIFO 104 and unload data from top fall-through FIFO 102 (step 504) with the process then returning to step 500.

Figure 6:
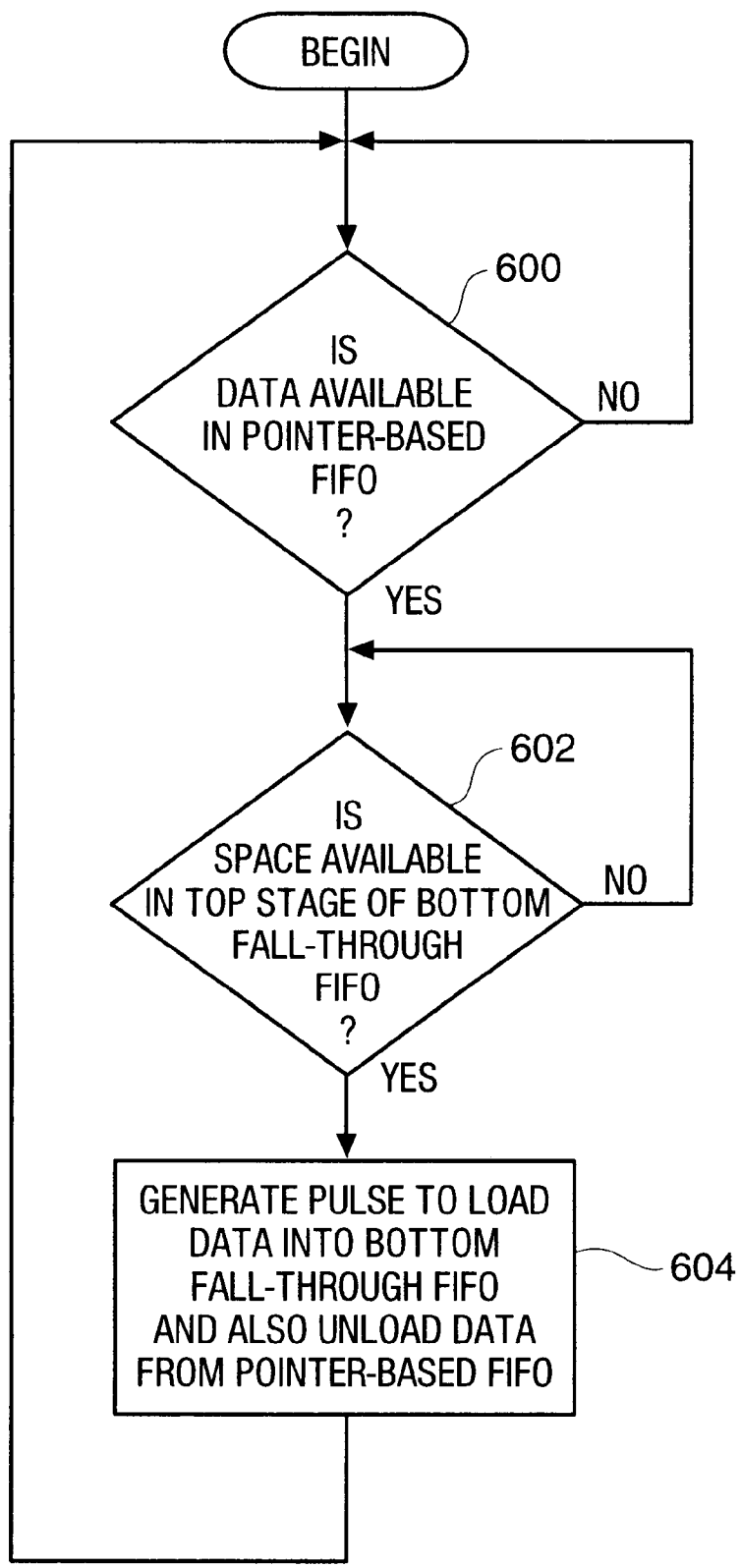
FIG. 6 is a flowchart of a process followed by a bottom control logic unit in FIG. 1 used to load data according to the present invention.

With reference now to FIG. 6, a flowchart of a process followed by control logic unit 110 in FIG. 1 to load data is depicted according to the present invention. The process begins by determining whether data is available in pointer-based FIFO 104 (step 600). If data is not available, the process returns to step 600. Upon data being available in pointer-based FIFO 104, the process then determines whether space is available in the top stage of bottom fall-through FIFO 106 (step 602). The process continues to return to step 602 until space is available for data. Upon space being available in the top stage of bottom fall-through FIFO 106, the process generates a pulse or signal to load data into bottom fall-through FIFO 106 and unload data from pointer-based FIFO 104 (step 604) with the process returning to step 600. 1

Figure 7:
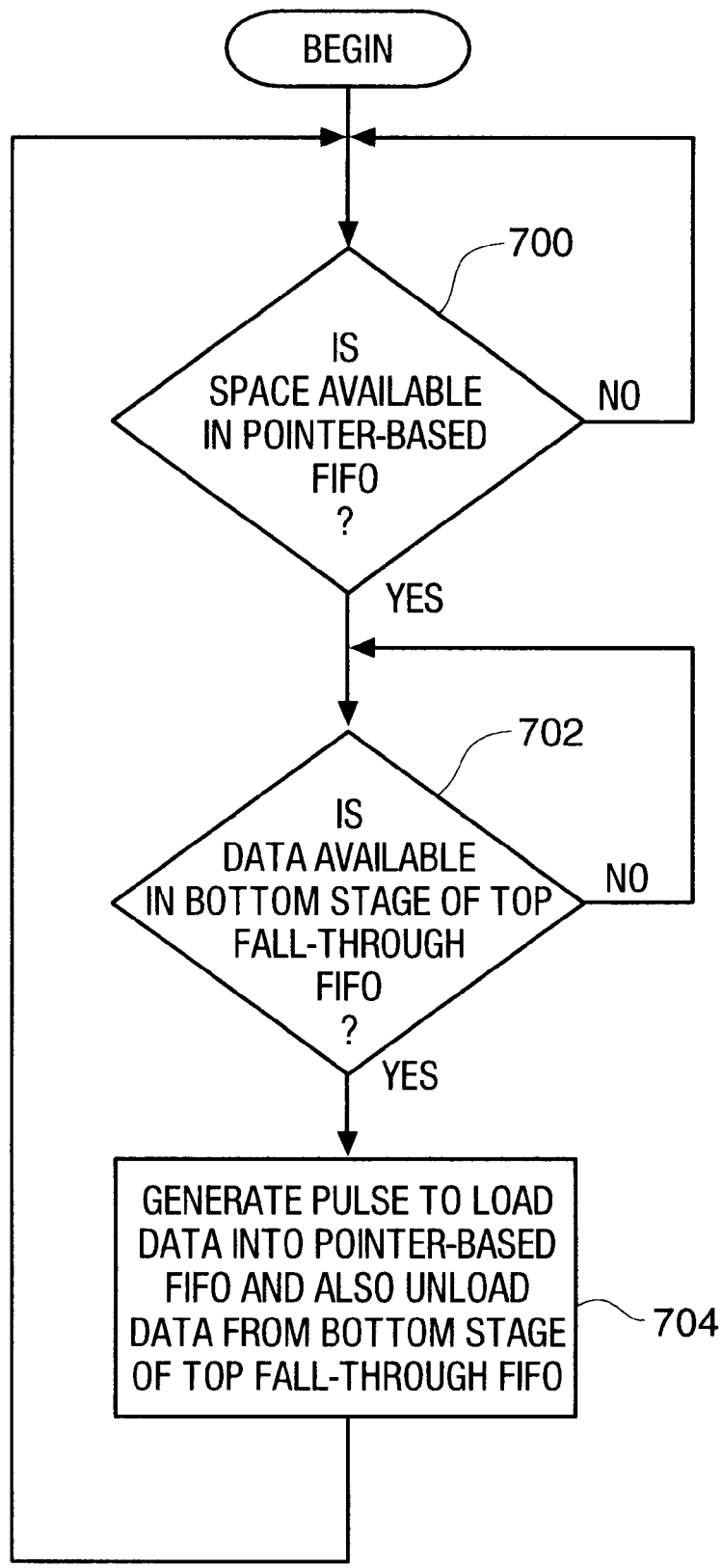
FIG. 7 is a flowchart of a process followed by a top control logic unit for unloading data according to the present invention.

With reference now to FIG. 7, a flowchart of a process followed by control logic unit 108 for unloading data is depicted according to the present invention. The process begins by determining whether space is available in pointer-based FIFO 104 (step 700). If space is unavailable, the process returns to step 700. Otherwise, the process determines whether data is available in the bottom stage of top fall-through FIFO 102 (step 702). If data is unavailable, the process returns to step 702. Otherwise, the process generates a pulse or signal to load data into pointer-based FIFO 104 and unload data from the bottom stage of top fall-through FIFO 102 (step 704) with the process returning to step 700.

Figure 8:
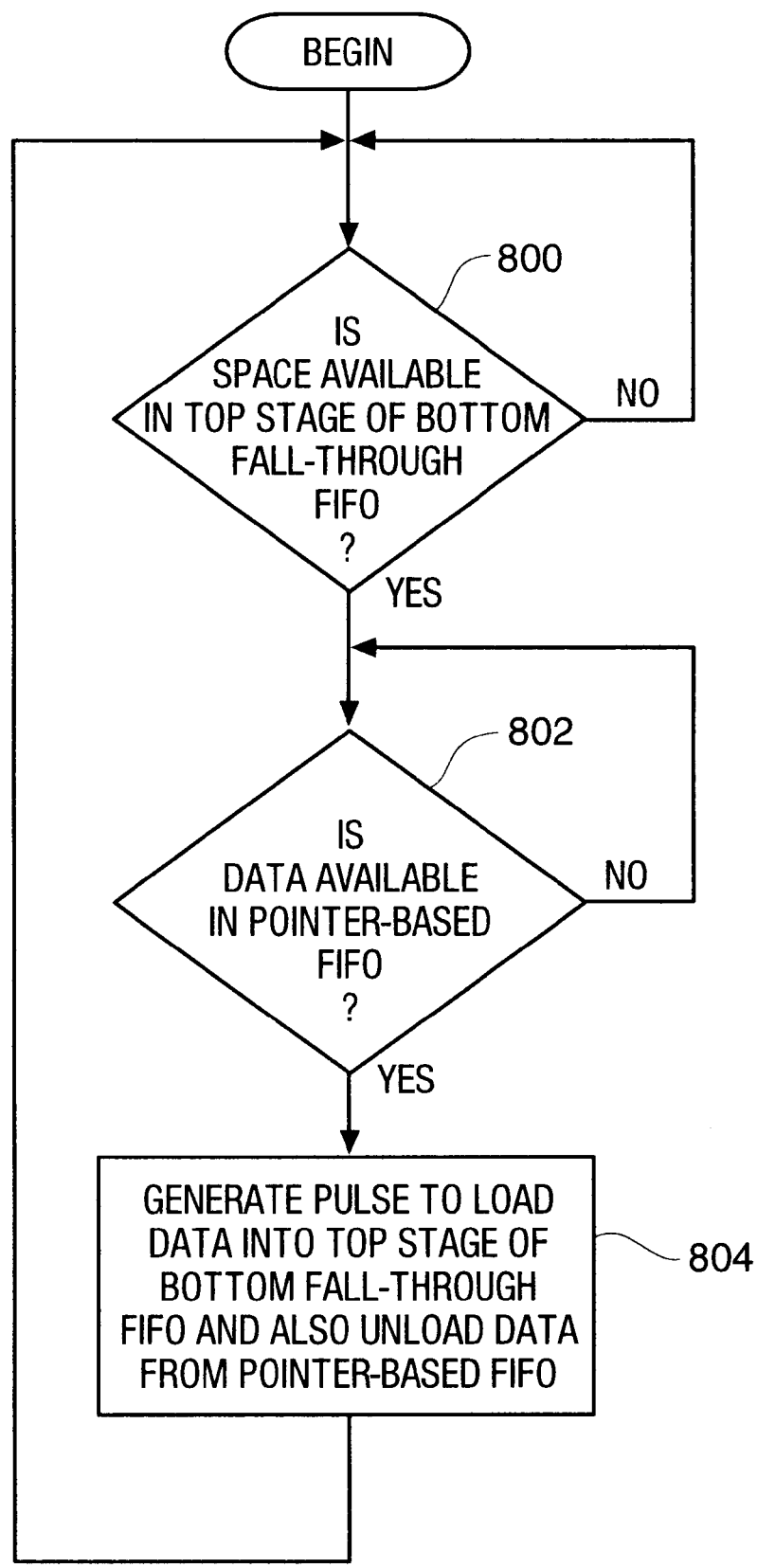
FIG. 8 is a flowchart of a process followed by a bottom control logic unit to unload data according to the present invention.

With reference now to FIG. 8, a flowchart of a process followed by control logic unit 110 to unload data is depicted according to the present invention. The process begins by determining whether space is available in the top stage of bottom fall-through FIFO 106 (step 800). If space is unavailable, the process returns to step 800. Otherwise, the process determines whether data is available in pointer-based FIFO 104 (step 802). If data is unavailable in pointer-based FIFO 104, the process returns to step 802. Upon data being available in pointer-based FIFO 104, the process generates a pulse or signal to load data into the top stage of bottom fall-through FIFO 106 and unload data from the pointer-based FIFO 104 (step 804) with the process returning to step 800.

Figure 9:
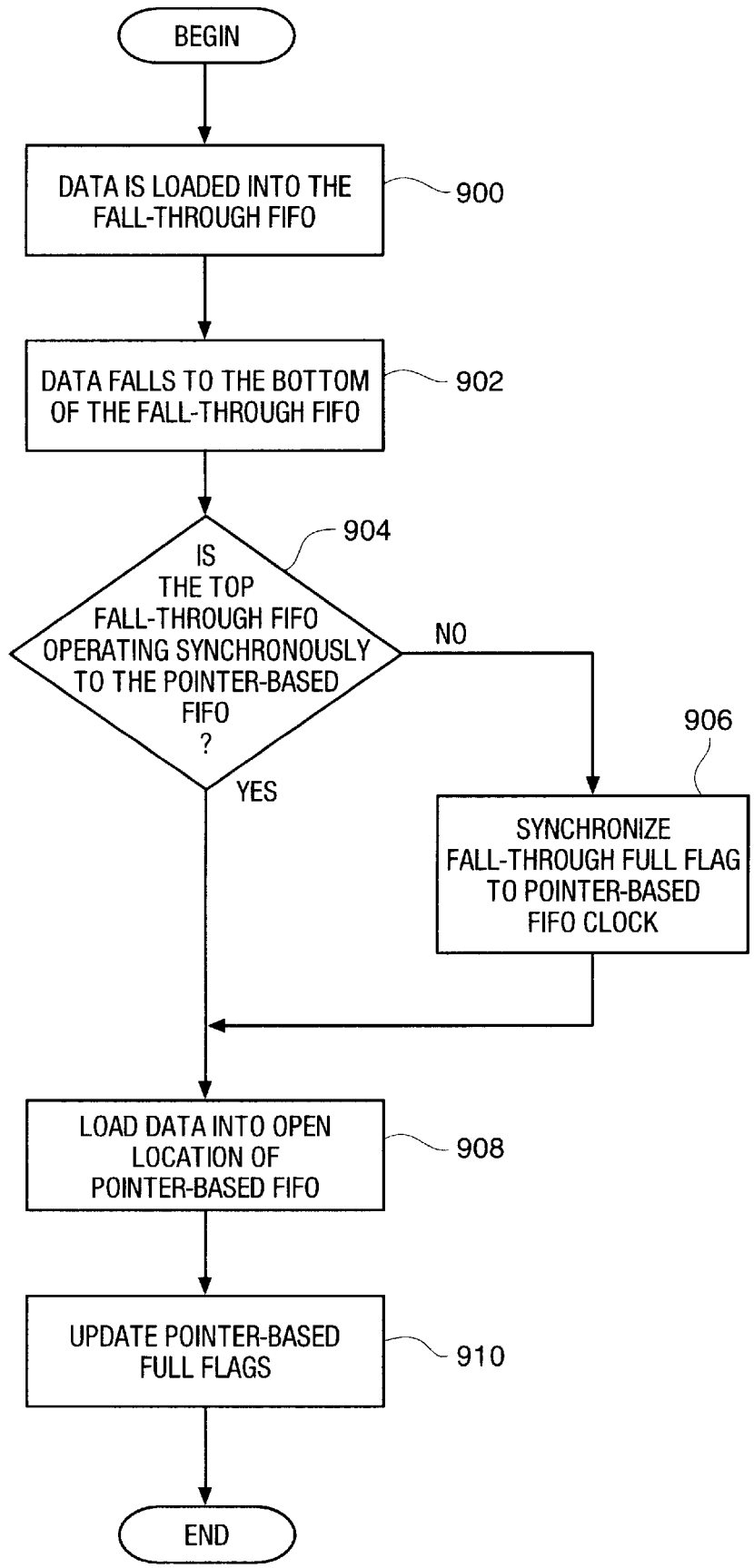
FIG. 9 is a flowchart of a synchronous/asynchronous data transfer load procedure according to the present invention.

With reference now to FIG. 9, a flowchart of a synchronous/asynchronous data transfer load procedure is depicted according to the present invention. The process begins by loading data into fall-through FIFO 102 (step 900). Thereafter, the data falls to the bottom stage of fall-through FIFO 102 (step 902). A determination is then made as to whether top fall-through FIFO 102 is operating synchronously to pointer-based FIFO 104 (step 904). If top fall-through FIFO 102 is not operating synchronously, the process then synchronizes the fall-through full flag (F2Full (0) in fall-through FIFO 102), to the clock for pointer-based FIFO 104 (step 906). The process then loads data into an open location in pointer-based FIFO 104 (step 908). The process also proceeds directly to step 908 from step 904 when top fall-through FIFO 102 operates synchronously with pointer-based FIFO 104. The process then updates the full flags for pointer-based FIFO 104 (step 910).

Figure 10:
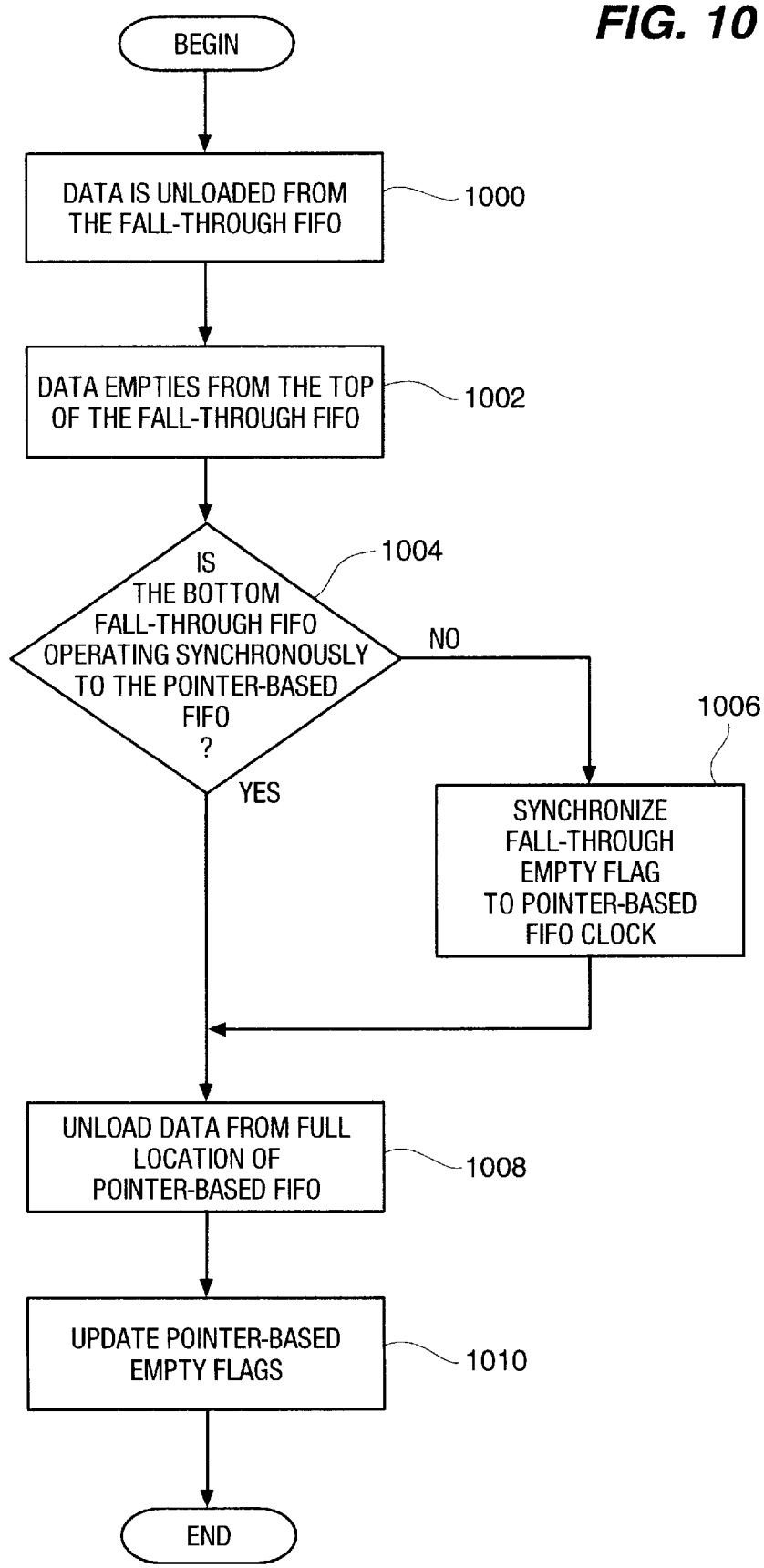
FIG. 10 is a flowchart of a process for synchronous/asynchronous unloading of data according to the present invention.

With reference now to FIG. 10, a flowchart of a process for synchronous/asynchronous unloading of data is depicted according to the present invention. The process begins by unloading data from bottom fall-through FIFO 106. Thereafter, data empties from the top of bottom fall-through FIFO 106 (step 1002). A determination is then made as to whether bottom fall-through FIFO 106 is operating synchronously to pointer-based FIFO 104 (step 1004). If bottom fall-through FIFO 106 is not operating synchronously to pointer-based FIFO 104, the process then synchronizes the empty flag (FTOPEMPTY_Fast in bottom fall-through FIFO 310) in bottom fall-through FIFO 106 to the clock of pointer-based FIFO 104 (step 1006). Thereafter, the process unloads data from the full location of pointer-based FIFO 104 (step 1008). The process also proceeds directly to step 1008 from step 1004 if bottom fall-through FIFO 106 is operating synchronously to pointer-based FIFO 104. Next, the process updates the empty flags for pointer-based FIFO 104 (step 1010) with the process terminating thereafter.

Figure 11:
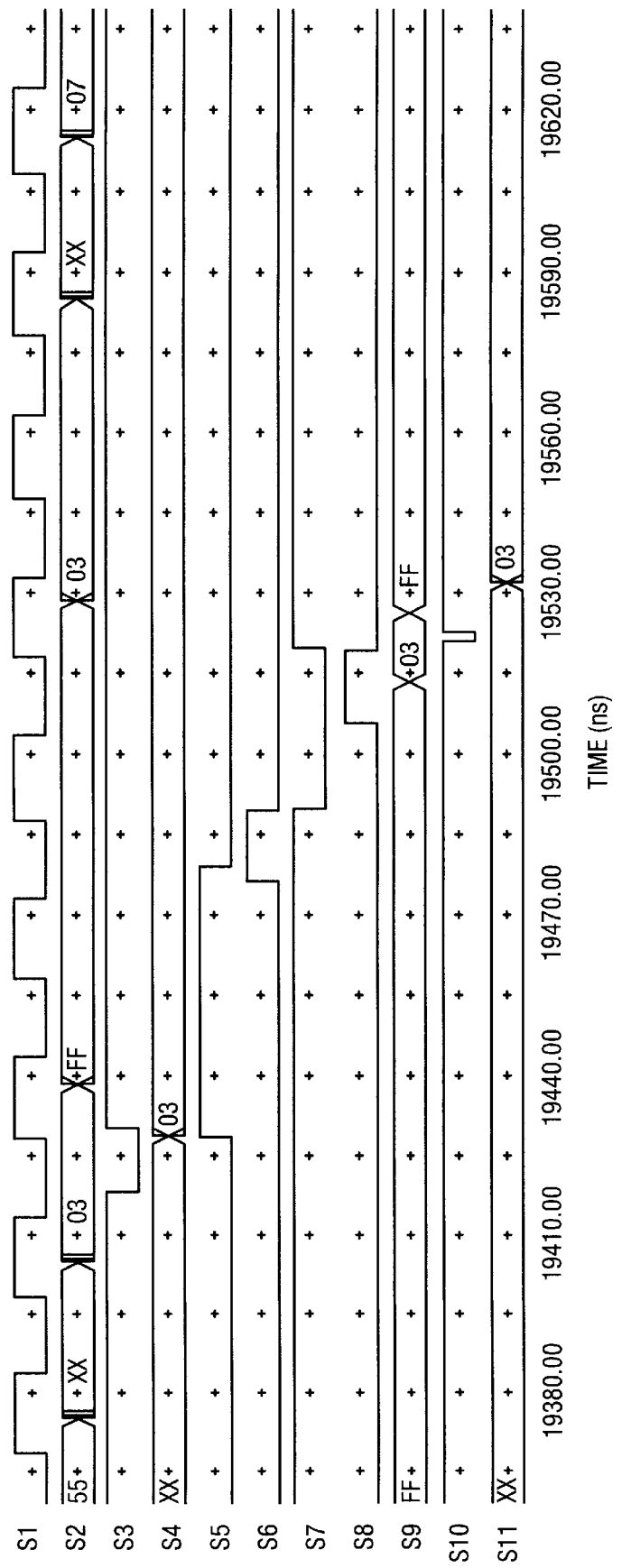
FIG. 11 is a timing diagram depicting an operation in which a single load occurs in a FIFO memory system according to the present invention.

Turning now to FIGS. 11–14, timing diagrams illustrating waveforms in various portions of FIFO memory system 100 are depicted according to the present invention. In particular, FIG. 11 depicts an operation in which a single load occurs in FIFO memory system 100. Signal S1 is the clock signal driving all operations in FIFO memory system 100. Signal S2 illustrates the data input into FIFO memory system 100. Signal S3 is the FLDN signal telling top fall-through FIFO 302 to load data. Signal S4 shows when data has fallen to bottom stage of top fall-through FIFO.

Next, signal S5 indicates when the top fall-through FIFO 302 has data and is ready to load data into the pointer-based FIFO. Signal S6 illustrates a signal from output PULSE1 in top control logic unit 308 indicating that pointer-based FIFO 304 should load data from top fall-through FIFO 302. Signal S7 indicates whether the pointer-based FIFO 304 is empty and is used as a flag to bottom control logic unit 310. Signal S8 indicates a load signal from output PULSE1 of bottom control logic unit 310 to bottom fall-through FIFO 306. Assertion of this signal causes bottom fall-through FIFO 306 to load data from pointer-based FIFO 304. Signal S9 indicates data in the path between pointer based FIFO 304 and bottom fall-through FIFO 306. Signal S10 indicates whether room is left in the top stage of bottom fall-through FIFO 306. If no room is left, bottom control logic unit 310 receives a signal indicating that bottom fall-through FIFO 306 cannot accept any data. Signal S11 shows the output from FIFO memory system 100. Signal S12 causes bottom fall-through FIFO 306 to unload data from the bottom stage.

Figure 12:
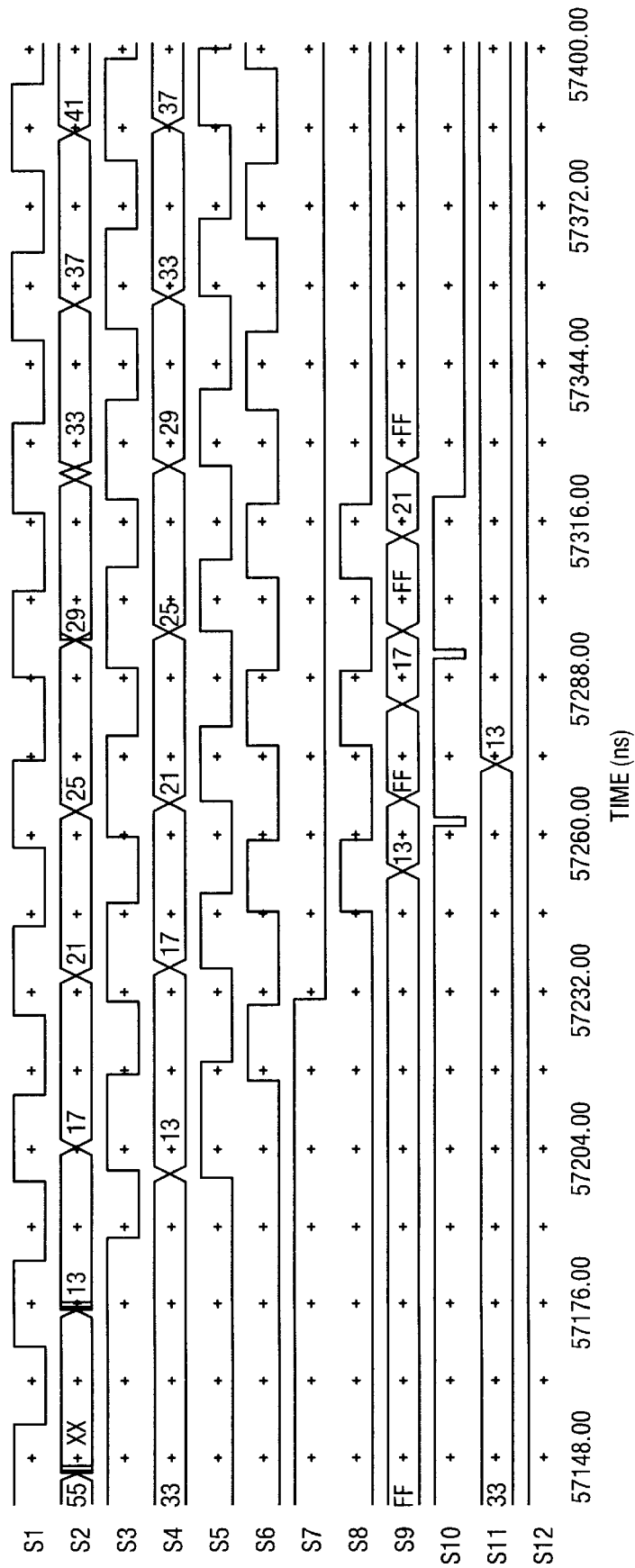
FIG. 12 is a timing diagram illustrating a scenario in which multiple loads occur in a FIFO memory system according to the present invention.
Figure 13:
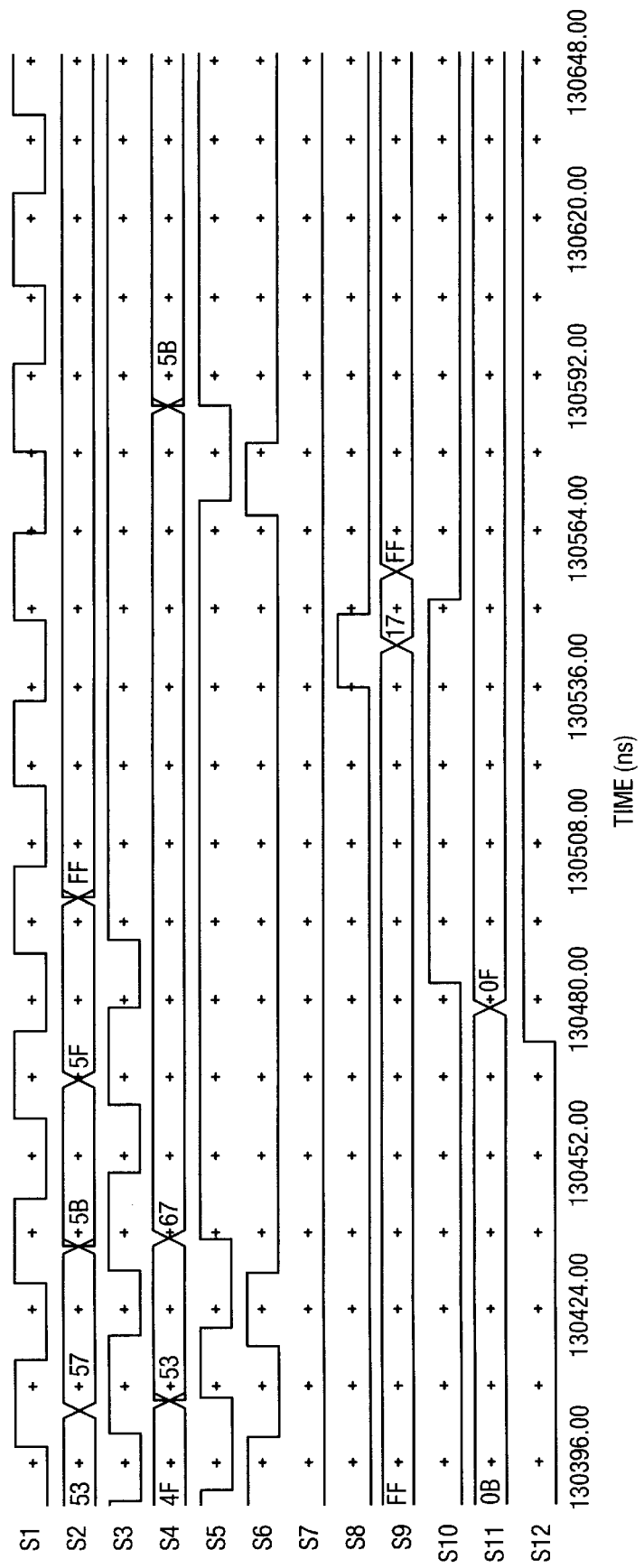
FIG. 13 is a timing diagram illustrating a single unload operation in a FIFO memory system according to the present invention.
Figure 14:
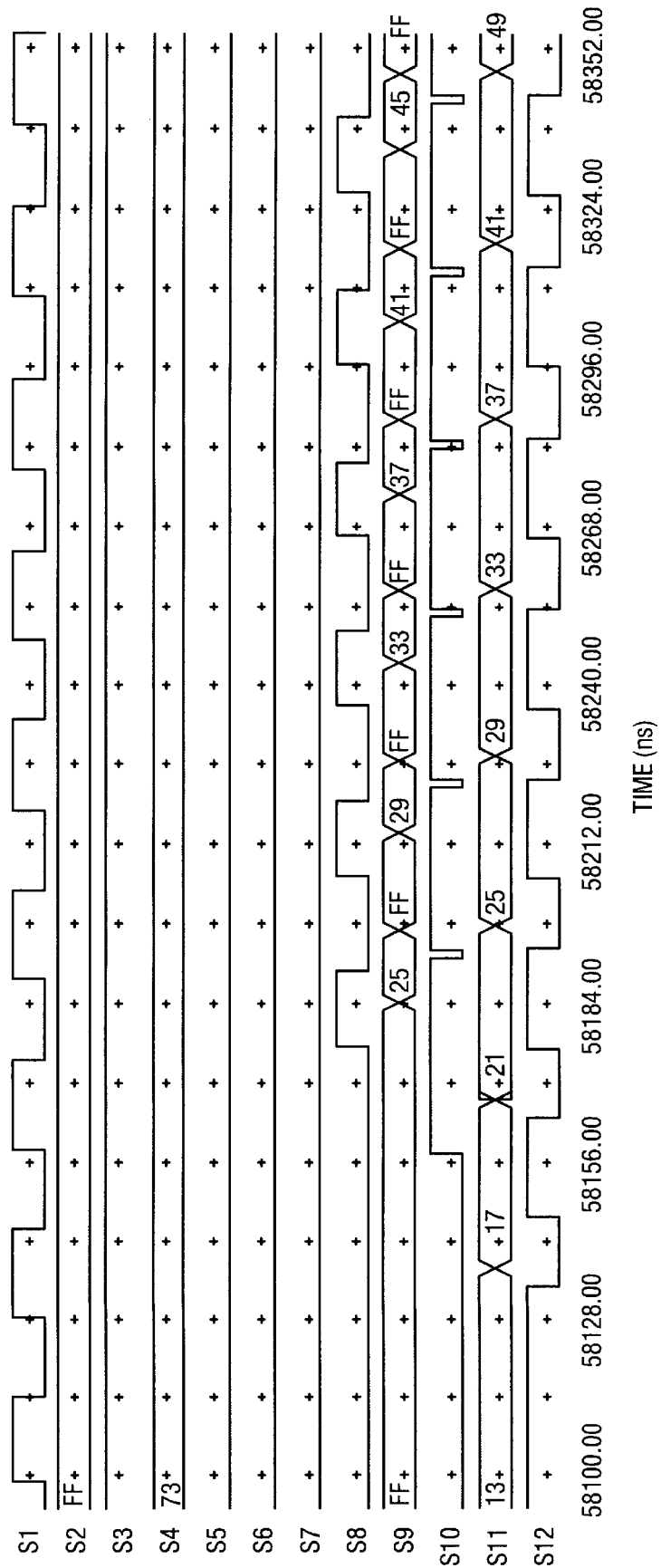
FIG. 14 is a timing diagram illustrating multiple unload operations in a FIFO memory system according to the present invention.

FIG. 12, illustrates a scenario in which multiple loads occur in FIFO memory system 300. FIG. 13 illustrates a single unload operation in FIFO memory system 300, while FIG. 14 shows multiple unload operations in FIFO memory system 300.

Thus, the FIFO memory system of the present invention provides an improved FIFO memory system that draws attributes from both pointer-based and fall-through FIFOs and combines the advantages of both in a unique combination allowing the increase in the size of the FIFO memory system without increasing data latency. The present invention provides a fixed latency fall-through FIFO architecture in which the top portion of the FIFO memory system is a fall-through FIFO, the middle portion of the system is a pointer-based FIFO, and the bottom portion is a fall-through FIFO.

The use of the pointer-based FIFO between the two fall-through FIFO's allows for the use of the FIFO memory system of the present invention as a fall-through FIFO that has a fixed latency even when the size of the FIFO memory system is increased. Other devices connected to the FIFO memory system of the present invention see the system only as a fall-through FIFO memory system. The latency of data is fixed by the use of a pointer-based FIFO as a middle stage between the two fall-through FIFOs.

While the invention has been particularly shown and described with reference to a preferred embodiment, it will be understood by those skilled in the art that various changes in form and detail may be made therein without departing from the spirit and scope of the invention.

What is claimed is:

1. A first-in-first-out memory system comprising:
   a first plurality of memory locations having a first memory location and a last memory location, wherein the first plurality of memory locations are sequentially associated with each other, data placed into the first memory location within the first plurality of memory locations automatically moves through the first plurality of memory locations to a last empty memory location within the first plurality of memory locations, and data is removed from the last memory location within the first plurality of memory locations;

a second plurality of memory locations, wherein data from the last memory location in the first plurality of memory locations and placed into an open memory location within the second plurality of memory locations and remains in that memory location until removed from the second plurality of memory locations; and a third plurality of memory locations having a first memory location and a last memory location, wherein the third plurality of memory locations are sequentially associated with each other, wherein data removed from the second plurality of memory locations and placed into the first memory location within the third plurality of memory locations automatically moves through the third plurality of memory locations to a last empty memory location within the third plurality of memory locations, and data is removed from the last memory location within the third plurality of memory locations; and means for moving data from the first plurality of memory locations to the second plurality of memory locations and from the second plurality of memory locations to the third plurality of memory locations.

2. The first-in-first-out memory system of claim 1, wherein the means for moving data comprises a first control logic unit connected to the first plurality of memory locations and the second plurality of memory locations and a second control logic unit connected to the second plurality of memory locations and the third plurality of memory locations.

3. The first-in-first out (FIFO) memory system of claim 2, wherein data is loaded and unloaded synchronously.

4. The first-in-first out memory system of claim 3, wherein data is loaded and unloaded asynchronously.

5. The first-in-first out memory system of claim 1, wherein the first memory location in the first plurality of memory locations is coupled to a SCSI bus.

6. The first-in-first out memory system of claim 5, wherein the last memory location in the third plurality of memory locations is coupled to a SCSI bus.

7. The first-in-first out memory system of claim 6, wherein the last memory location in the third plurality of memory locations is coupled to a PCI bus.

8. The first-in-first out memory system of claim 1, wherein the first memory location in the first plurality of memory locations is connected to a PCI bus.

9. The first-in-first out memory system of claim 1, wherein the first memory location in the first plurality of memory locations is coupled to a PCI bus and the last memory location within the third plurality of memory locations is coupled to a PCI bus.

10. A first-in first-out (FIFO) memory system comprising:

a first FIFO having a plurality of memory locations, an input, and an output, wherein the input is connected to a first memory location within the plurality of memory locations and the output is connected to a last memory location within the plurality of memory locations, wherein data placed into the first FIFO at the first input automatically moves from the first memory location to a last empty memory location within the plurality of memory locations;

a second FIFO having a plurality of memory locations, an input, and an output, wherein the input connected to the output of the first FIFO and data placed into the input of the second FIFO is placed into an open memory location, associated with a pointer, and retrieved at the output of the second FIFO in a first-in first-out basis from the open memory location; and a third FIFO having a plurality of memory locations, an input, and an output, wherein the input is connected to the output of the second FIFO and to a first memory location within the plurality of memory locations in the third FIFO and an output is connected to a last memory location within the plurality of memory locations in the third FIFO, wherein the data placed into the third FIFO at the first input automatically moves from the first memory location to a last empty memory location within the plurality of memory locations in the third FIFO.

11. The FIFO memory system of claim 10, further comprising control logic for controlling the movement of data placed into the first input through the second FIFO and the third FIFO to the third output.

12. The FIFO memory system of claim 11, wherein the control logic comprises:

first loading means to load data into the first memory location in the first FIFO;

first determination means for determining whether a memory location is available in the second FIFO and whether data is present in the last memory location of the first FIFO;

second loading means, responsive to a memory location being available in the second FIFO and to data being present in the last memory location in the first FIFO, for loading data from the last memory location in the first FIFO into the available memory location in the second FIFO;

second determination means, responsive to data being present in the second FIFO, for determining whether the first memory location in the third FIFO is empty; and third loading means, responsive to the first memory location in the third FIFO being empty, for loading data from the output of the second FIFO into the third FIFO.

13. The FIFO memory system of claim 12, wherein the control logic further comprises:

first unloading means, responsive to data being present at the last memory location in the third FIFO for unloading data from the last memory location in the third FIFO;

third determination means for determining whether data is available in the second FIFO;

fourth loading means, responsive to data being available in the second FIFO, for loading data from the second FIFO into the first memory location in the third FIFO;

fourth determination means, responsive to loading data from the second FIFO into the first memory location in the third FIFO, for determining whether data is present at the last memory location in the first FIFO; and fifth loading means, responsive to data being present in the last memory location of the first FIFO, for loading data from the last memory location in the first FIFO into an empty location in the second FIFO.

14. The FIFO memory system of claim 13, wherein the control logic comprises a first control logic unit connected to the first FIFO and the second FIFO and a second control logic unit connected to the second FIFO and the third FIFO.

15. The FIFO memory system of claim 14, wherein the first control logic unit comprises:

means for determining whether data is available in the last memory location of the first FIFO;

means for determining whether space is available in the second FIFO in response to a determination that data is available in the last memory location of the first FIFO; and movement means for moving data from the last memory location of the first FIFO to the second FIFO.

16. The FIFO memory system of claim 15, wherein the second control unit comprises:

means for determining whether data is available in the second FIFO;

means for determining whether space is available in the first memory location of the third FIFO in response to a determination that data is available in the second FIFO; and movement means for moving data from the second FIFO to the first memory location of the third FIFO.

17. A first-in-first-out (FIFO) memory system comprising:

a first fall-through FIFO having an input and an output;

a pointer-based FIFO having an input and an output, wherein the input of the pointer-based FIFO is connected to the output of the first fall-through FIFO; and a second fall-through FIFO having an input and an output, wherein the input of the second fall-through FIFO is connected to the output of the pointer-based FIFO and wherein data placed into the input of the first fall-through FIFO appears at the output of the second fall-through FIFO in a first-in-out basis.

18. The FIFO memory system of claim 17, further comprising control logic for controlling the movement of data through the FIFO memory system.

19. The FIFO memory system of claim 18, wherein the control logic comprises:

a first control logic unit connected to the first fall-through FIFO and the pointer-based FIFO, wherein the first control logic unit controls the movement of data from the first fall-through FIFO to the pointer-based FIFO; and a second control logic unit connected to the pointer-based FIFO and the second fall-through FIFO, wherein the control logic unit controls the movement of data from the pointer-based FIFO to the second fall-through FIFO.

20. The FIFO memory system of claim 19, wherein the first control logic unit has a mode of operation in which data is moved from the output of the first fall-through FIFO to the input of the pointer-based FIFO in response to space being available in the pointer-based FIFO and the second control logic unit having a mode of operation in which data is moved from the output of the pointer-based FIFO in response to space being available in the second fall-through FIFO.

* * * * *